United States Patent [19]
Schade

[11] 4,035,699
[45] July 12, 1977

[54] BRUSHLESS DIRECT CURRENT MACHINE AND METHOD OF CONTROLLING THE SAME

[76] Inventor: Walter Schade, Alter Postweg 28,, 427 Dorsten, Germany

[21] Appl. No.: 435,583

[22] Filed: Jan. 22, 1974

Related U.S. Application Data

[63] Continuation of Ser. No. 166,430, Nov. 10, 1971.

[51] Int. Cl.$^2$ .................................. H02K 29/00
[52] U.S. Cl. ........................... 318/138; 318/254; 318/439
[58] Field of Search ......... 318/138, 198, 199, 254, 318/171, 439

[56] References Cited
U.S. PATENT DOCUMENTS

| | | | |
|---|---|---|---|
| 3,475,668 | 10/1969 | Mieslinger | 318/138 |
| 3,488,566 | 1/1970 | Fukuda | 318/138 |
| 3,529,220 | 3/1968 | Kobayashi | 318/138 |
| 3,532,947 | 10/1970 | Grup | 318/171 |
| 3,648,137 | 3/1972 | Mieslinger | 318/138 |
| 3,663,878 | 5/1972 | Miyasaka | 318/254 |

*Primary Examiner* — Robert K. Schaefer
*Assistant Examiner* — John J. Feldhaus
*Attorney, Agent, or Firm* — Herbert L. Lerner

[57] ABSTRACT

In a brushless D. C. motor which is controlled by electronic circuits, the armature which is of the shorted drum type, is constructed in the form of a double or multiple coil winding which acts to prevent high circuit interruption potential which might damage the electronic control circuits. The double or multiple winding may be constructed as a double or multiple conductor winding. The multiple windings are separate one from the other and are connected together to supply terminals through the electronic control circuits.

1 Claim, 3 Drawing Figures

BRUSHLESS DIRECT CURRENT MACHINE AND METHOD OF CONTROLLING THE SAME

This is a continuation, of application Ser. No. 166,430, filed Nov. 10, 1971.

The invention relates to electro-dynamic machines, and more particularly to such machines adapted to be energized from a direct current source which requires no mechanical commutator; and method of controlling the same.

Heretofore known direct current machines with a mechanical commutator have had a number of faults which may be avoided through the use of electronic switching circuits. The commutator and brushes, the complicated and expensive construction of the rotor, and the rotating output winding must be designated as the faults due to the limitation of the speed of rotation with regard to centrifugal forces.

It is one of the objects of the invention to provide a brushless D.C. motor which will avoid the shortcomings of a motor having a commutator and brushes, such as complicated design and limitation of its rotational speed inherent in such a design.

It is a further object to provide a motor of the type defined which, by its construction of the stator winding in the form of multiple parallel coils or groups of coils, will avoid destructive circuit interruption phenomena including damaging high potentials.

It is still another object of the invention to provide a motor as defined above wherein a mechanical link between the rotating element of the machine with the control is eliminated.

According to the invention, the commutator is replaced by electronic switching circuits and the shorted drum type armature winding takes the form of a double or multiple winding. The multiple winding acts to prevent during operation the interruption of the current supply and thereby the occurrence of high circuit interruption potentials, which could easily lead to a destruction of the electronic switching circuits. This design also simplifies the circuit design considerably, since the use of thyristors renders quenching very simple and the free time intervals become so large that shortcircuit phenomena have no chance to occur during the anti-parallel operation of the individual coil groups. The formation of the double or multiple winding is also quite simple, since it may be constructed as a double or multiple conductor winding. No special insulating precaution need be taken, since the double or multiple parallel windings possess either a very small or no potential difference with respect to one another. The double or multiple windings are in principle electrically separated from each other and are connected together only at the supply terminals through the electronic switching circuits.

The output winding is not rotary but instead, is disposed in a stator sheet metal pack as in an A.C. machine. The rotor may take the form either of a squirrel-cage type rotor as in an induction or a permanent magnet or a field spider of a synchronous machine.

In accord with another form of the invention, the parallel winding may be omitted, since the quenching of the preceding circuit may be effected through condensers in parallel with the winding elements of the switching circuits connected with the step switching thyristors.

The arrangements known heretofore provide all such machines with open rotor windings and, accordingly, have poor iron and copper utilization characteristics within the framework of electrical machine design.

The invention, together with further objects and advantages, may be be understood by referring to the following description taken in conjunction with the appended drawings in which like numerals indicate like parts and in which.

Figure 1:
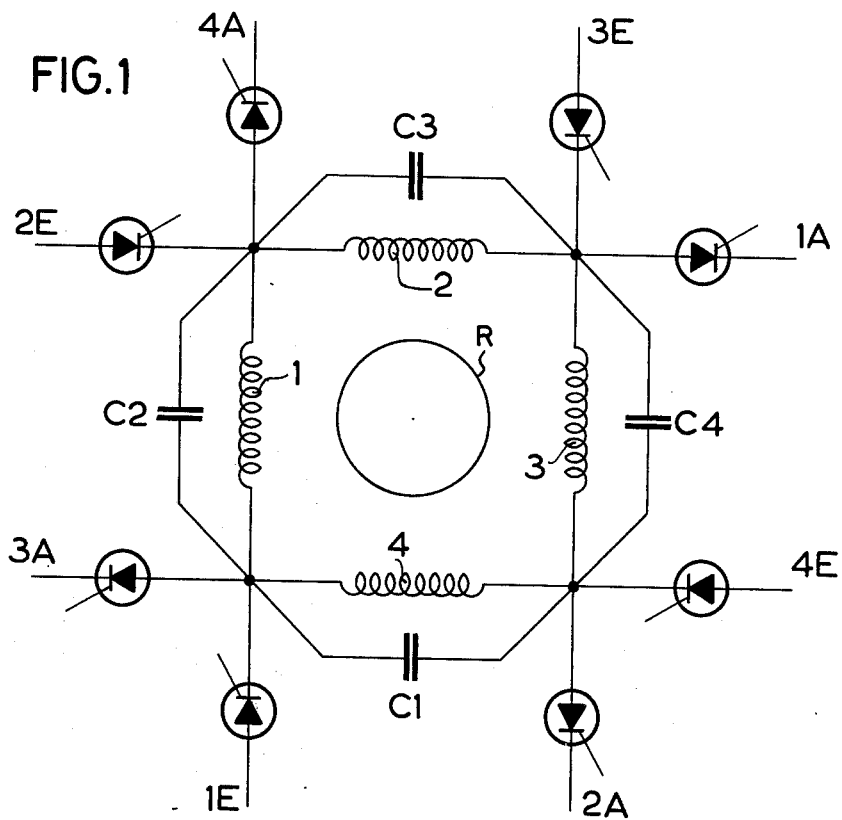
FIG. 1 is a schematic circuit diagram of the armature of a D.C. motor according to the invention.

Referring now to the drawing and first particularly to FIG. 1 thereof, there is shown therein schematically a circuit for the supply and step-wise switching of closed loop drum type winding provided with four input terminals. The number of such input terminals may be varied over a wide range.

The armature is comprised of a group of coils 1, 2, 3 and 4. The corresponding current paths are shown at IE (E = input) - 1A (A = output). Similarly, the other current paths are indicated at:

2E - 2A
3E - 3A
4E - 4A.

The switching and quenching actions occur as follows:

Assume that the starting point is at 1E and 1A. The next step is then 2E - 2A or 4E - 4A for the reverse rotation. Upon ignition of the thyristors of circuits 2 or 4, the thyristors of circuit 1 will be quenched with the aid of condensers $C_1$, $C_2$ and so forth. Subsequently, the thyristors of circuit 3 will effect the quenching of the thyristors of circuit 2, and so on.

The machine may also be operated as a synchronous converter by taking off alternating current or multiphase potentials from the various points of the winding which are electrically displaced by the desired phase angle.

It is not necessary that the rotor revolve. It is possible to dispense with the rotor winding altogether and the rotor may then remain static. In order to decrease the leakage flux, the stator and rotor sheet packs may be conically layered so that the air gap is totally closed.

The control in previously known electronically controlled electric motors, has been a function of the angle of rotation of the rotor R in relation to the magnetic axis of the motor. This makes it necessary that a mechanical linkage by provided between the rotating portion of the machine and the control system.

In accord with a further embodiment of the invention, it is proposed that such a mechanical coupling be omitted in order to avoid the difficulties inherent in a built-in as well as in a separate control.

The invention is based on the concept that the time that a motor coil or a group of coils of an electronically controlled motor is in circuit, is a function in the mathematical sense of the speed of revolution of the rotating magnetic field. At the same time, the speed or revolution, for instance, of a D.C. shunt motor is a function of the operating voltage. Accordingly, the in-circuit time of the winding elements of the coil groups which are brought into circuit sequentially, becomes a function of the motor operating voltage. The in-circuit period must therefore become shorter as the rotational speed of the motor increases.

Figure 2:
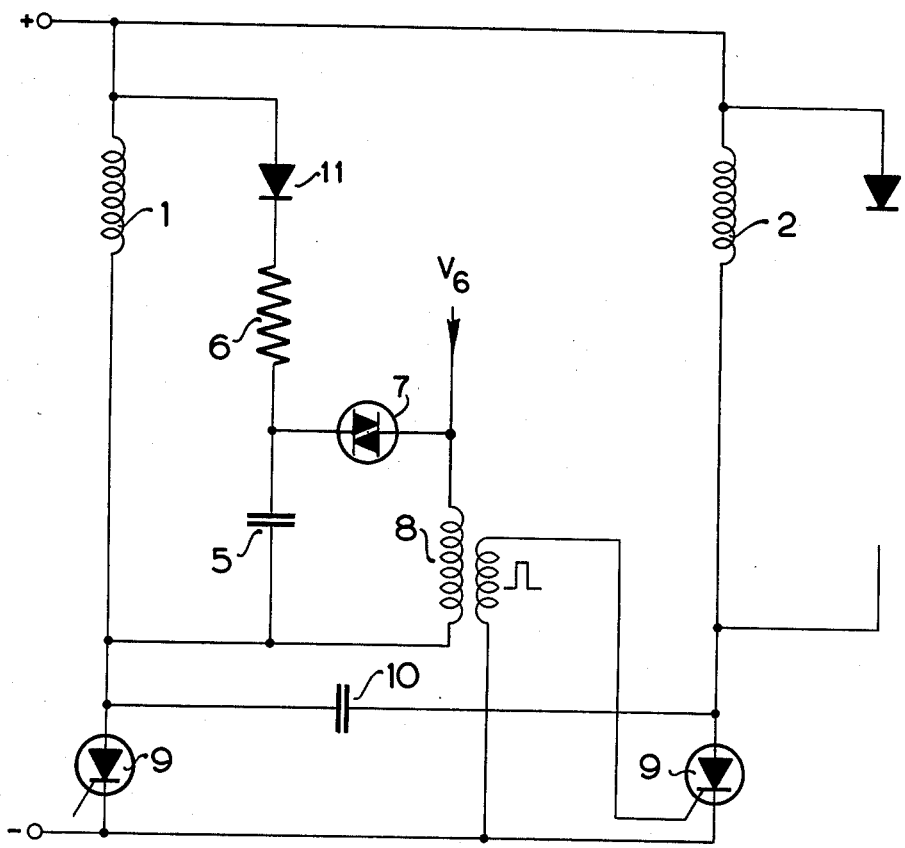
FIG. 2 is a schematic circuit diagram of a part of the motor armature and control circuits therefor.

This requirement is fulfilled very easily by means of a timing circuit, as shown in FIG. 2, which includes a condenser 5, a diode 11, and a resistance 6 connected in series therewith. The primary coil of an ignition transformer 8 is connected in parallel circuit across the condenser 5 in series with a trigger diode 7. The transformer 8 produces an ignition pulse in its secondary winding or windings upon the attainmemt of the breakdown potential of the trigger diode 7. The diode breakdown potential may be varied by means of a biasing potential, whereby a variation of the firing order may also be achieved. The firing order can be changed by varying the operational voltage, since the capacitor 5 becomes charged more rapidly with a rising operational voltage and, therefore, reaches the breakthrough point more rapidly. Therefore, through biasing voltages (not shown in the drawing), it is possible at a low operational voltage, to adjust the firing order to the RPM. As soon as one or a pair of thyristors become conductive, the preceding thyristor or thyristors will be quenched through condenser 10.

Figure 3:
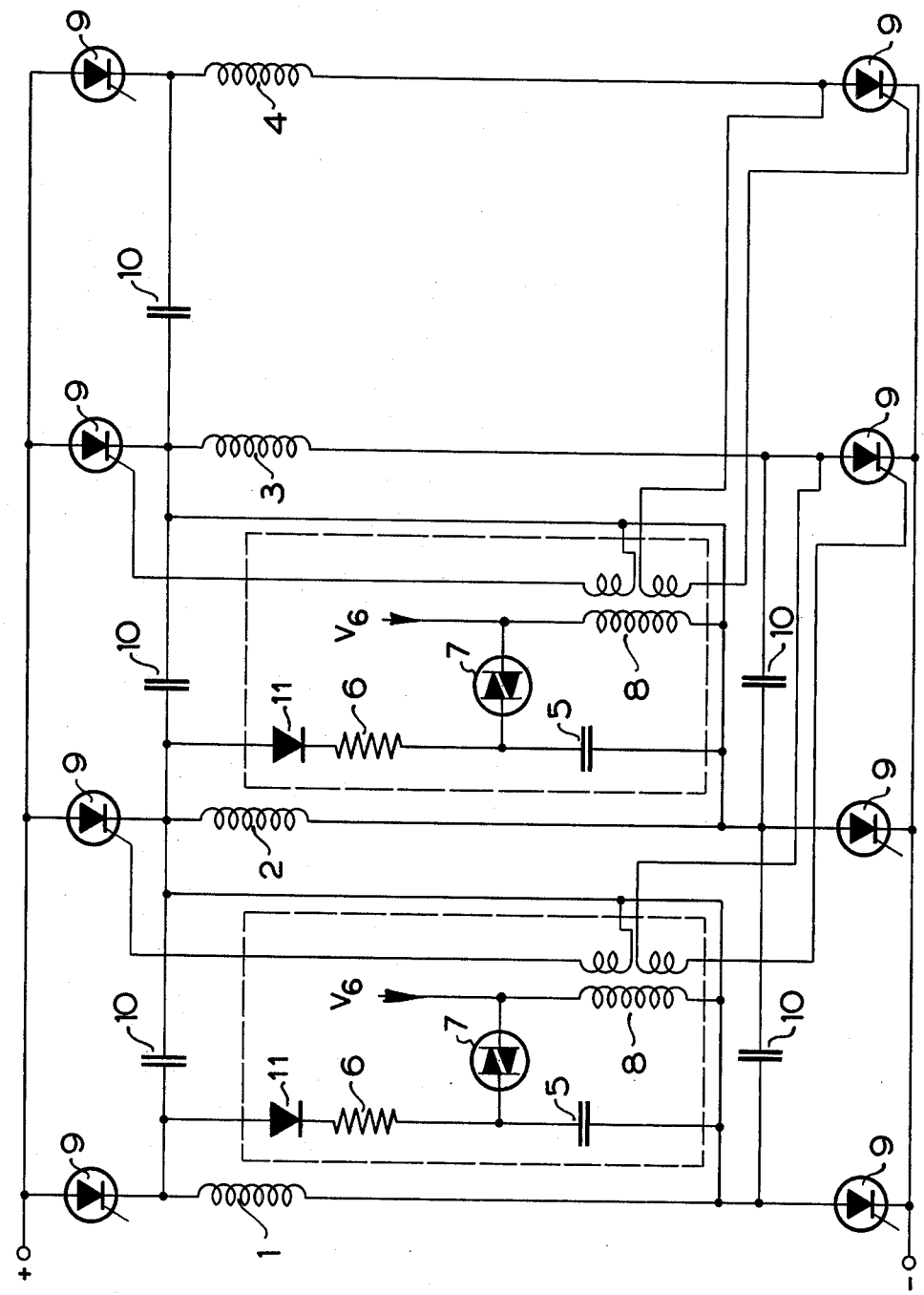
FIG. 3 is a schematic circuit diagram showing several parts of the motor armature with an alternative form of control circuit therefor.

The ignition pulses, from transformer 8 in FIG. 2, may be applied either to the next respective coil 1, 2, 3 or 4 in accordance with the rotational direction or, as shown in FIG. 3, to the next two thyristors 9 in accordance with the direction of rotation, the thyristors 9 being electrically displaced by 180°. The motor is started by rendering conductive any one or any pair of thyristors. Thereafter, the magnetic field rotates with a speed dependent on the operating potential and pulls the rotor along either synchronously or asynchronously according to design.

I claim:
1. A brushless direct-current machine having a rotor comprising: a plurality of at least four stationary coil windings connected in a loop; a plurality of switching means at least equal in number to said plurality of stationary coil windings for sequentially connecting said coil windings to a source of direct-current electrical energy; quenching means responsive to the energization of at least one of said switching means for connecting a next coil winding to said source of direct-current electrical energy to sequentially quench the energized switching means; and a plurality of substantially identical timing networks independent of any mechanical connection to the rotor to which a common voltage is applied for cyclically activating each of said switching means at a cycle speed dependent upon the magnitude of the applied voltage, said windings comprising at least double-parallel coil windings insulated from one another.

* * * * *